United States Patent
Glenn et al.

[15] 3,689,892
[45] Sept. 5, 1972

[54] ELECTRONIC CONTROL APPARATUS HAVING LEARN AND AUTOMATIC OPERATE MODES

[72] Inventors: David A. Glenn, Cupertino; David N. Lytle, Tiburon, both of Calif.

[73] Assignee: Electroglas, Inc., Menlo Park, Calif.

[22] Filed: March 18, 1970

[21] Appl. No.: 20,706

[52] U.S. Cl..............................340/172.5, 318/568
[51] Int. Cl..........................G06f 15/18, G06f 15/46
[58] Field of Search.................................340/172.5 318/568; 346/33 MC; 235/151.11

[56] References Cited

UNITED STATES PATENTS

| | | |
|---|---|---|
| 3,238,430 | 3/1966 | Schuman....................318/568 |
| 2,475,245 | 7/1949 | Leaver et al........340/172.5 X |
| 2,537,770 | 1/1951 | Livingston et al. ..340/172.5 X |
| 2,755,422 | 7/1956 | Livingston et al. ........318/568 |
| 2,866,506 | 12/1958 | Hierath et al.......340/172.5 X |
| 2,937,365 | 5/1960 | Peaslee..................346/33 MC |
| 2,996,348 | 8/1961 | Rosenberg..............318/568 X |
| 3,059,236 | 10/1962 | Marantette et al. ...318/568 X |
| 3,212,649 | 10/1965 | Johnson et al......340/172.5 X |
| 3,391,392 | 7/1968 | Doyle......................340/172.5 |
| 3,449,540 | 6/1969 | Yanko et al. ..........318/568 X |

Primary Examiner—Paul J. Henon
Assistant Examiner—Melvin B. Chapnick
Attorney—Flehr, Hohbach, Test, Albritton & Herbert

[57] ABSTRACT

Electronic control apparatus and method using stepping motors which are operated open loop and which are slaved to counters so that the stepping motors first can be operated in a learn mode and information recorded in a memory, and thereafter operated automatically by use of the information recorded in the memory.

16 Claims, 2 Drawing Figures

ELECTRONIC CONTROL APPARATUS HAVING LEARN AND AUTOMATIC OPERATE MODES

BACKGROUND OF THE INVENTION

Computers have heretofore been provided for automating certain functions in manufacturing operations and in industrial processes. This has been disadvantageous because of the high cost of computers and the necessity of providing very skilled people for programming the computer to perform the necessary operations. There is a need for a control apparatus and method which eliminates these disadvantages.

SUMMARY OF THE INVENTION AND OBJECTS

The electronic control apparatus consists of at least one motive element which is capable of assuming at least first and second conditions. Means is provided for causing operation of the motive element so that it will assume said conditions and to thereby pass through a sequence of steps. Means is provided for retaining information as to the operation of said motive element as it moves through said sequence of steps. A memory is provided and means is provided for causing the memory to receive information which has been retained as each step is completed. Means is provided for using the information in the memory to cause the motive element to move through at least one of said steps contained in the memory.

The method for controlling at least one motive element consists of the steps of preparing a program for operation of the motive element by causing the motive element to go through the desired sequence of steps. Each step is recorded at the time that the motive element has completed going through the step. Thereafter, the information which has been recorded is utilized for causing the motive element to pass through at least one of the steps which has been recorded.

In general, it is an object of the present invention to provide an electronic control apparatus and method which can be utilized by relatively unskilled personnel.

Another object of the invention is to provide an apparatus and method of the above character which is relatively inexpensive.

Another object of the invention is to provide an apparatus and method of the above character which can be utilized for the simple effective automation of a broad variety of industrial processes and manufacturing operations at a minimum cost.

Another object of the invention is to provide an apparatus and method in which the steps are learned by experiencing them.

Another object of the invention is to provide an apparatus and method of the above character in which the steps are memorized by high speed digital bookkeeping on a step by step basis.

Another object of the invention is to provide an apparatus and method of the above character in which repeat cycles identical to the cycle which has been learned can be performed.

Another object of the invention is to provide an apparatus and method of the above character in which the steps can be readily edited or re-programmed.

Another object of the invention is to provide an apparatus and method of the above character in which the programs can be permanently stored.

Another object of the invention is to provide an apparatus and method of the above character which does not require paper tape or other software in the operation of the basic apparatus and method.

Another object of the invention is to provide an apparatus and method of the above character which eliminates the need for computers and computer programmers.

Additional features and objects of the present invention will appear from the description of the preferred embodiment which is shown in the accompanying drawing.

DESCRIPTION OF THE PREFERRED EMBODIMENT

Figure 2:
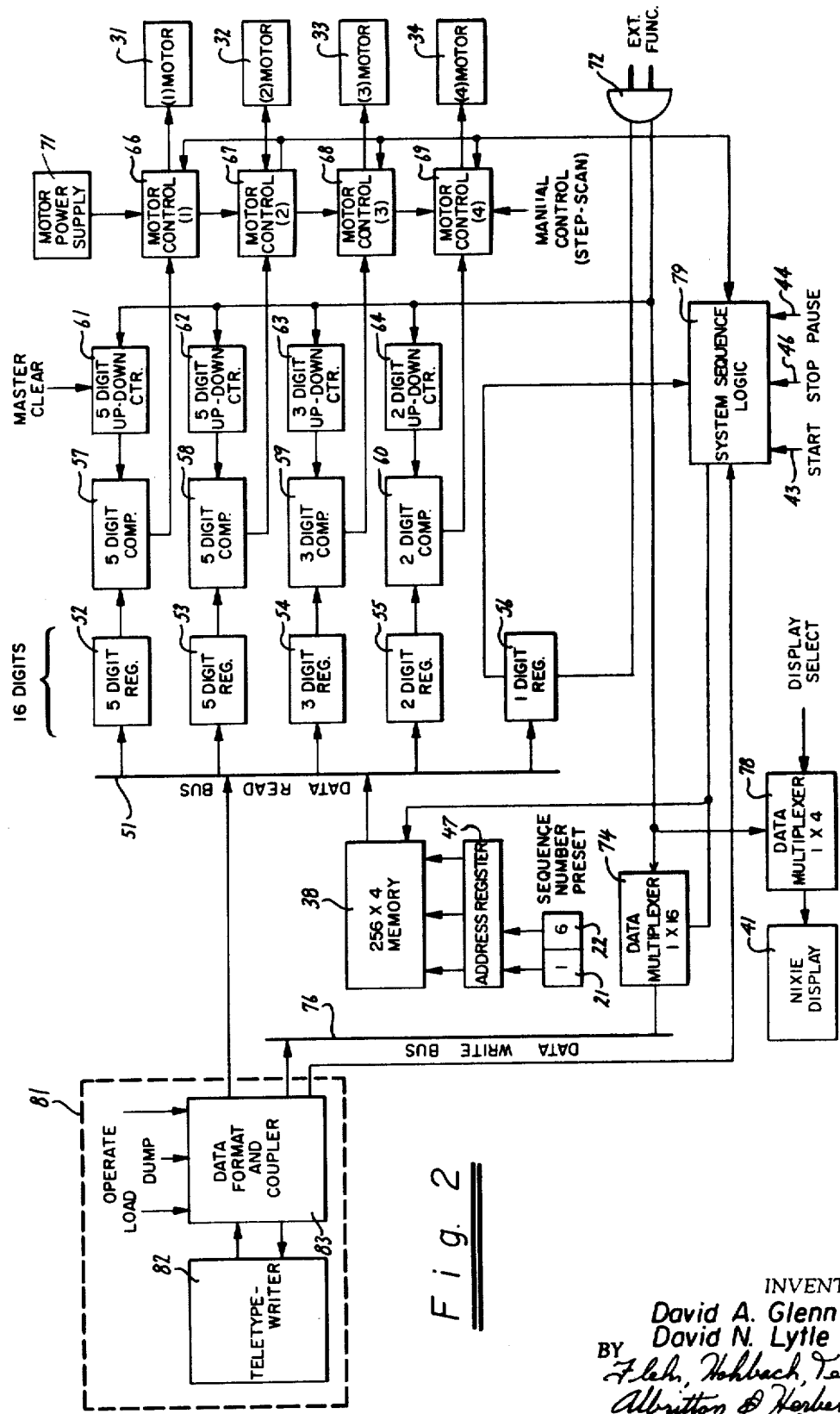
FIG. 2 is a block diagram of the electronic circuitry utilized in the electronic control apparatus shown in FIG. 1.

The electronic control apparatus consists of a console or cabinet 11 which has mounted therein all of the electronic circuitry which is shown in the block diagram in FIG. 2. The console or cabinet is provided with a front panel which is hinged at one side to the console or cabinet 11 by hinge 13. The front panel 12 is held in a closed position by a screw 14.

A plurality of controls and visual displays are provided on the front panel 12. As shown, there is provided a power on-off indicator 16 which indicates whether or not the control apparatus has been turned on or, in other words, connected to a source of power such as conventional 60 cycle a.c. The control apparatus is provided with a rechargeable standby power supply. A toggle switch 17 is provided for turning the motor power supply on or off. The control apparatus also includes a mode selector switch 18 which is capable of assuming three different positions: "operate", "learn" and "single sequence". There is also provided a separate toggle switch 19 which is capable of assuming two positions: "repeat cycle" and "single cycle". A pair of thumb wheel operated selector switches 21 and 22 are provided for selecting the step which is to be programmed by the control apparatus. As is well known to those skilled in the art, the thumb wheel switches 21 and 22 give a visual indication of their position and are capable of assuming positions from 0 to 9. A push button 23 is provided in conjunction with the sequence switches 21 and 22 and when it is operated causes the sequence which has been placed in the thumb wheel switches 21 and 22 to be displayed in a conventional read-out indicator identified as the address register display 24. As hereinafter explained, the number displayed in the display 24 will advance automatically as subsequent sequences or steps are programmed.

Control switches 26, 27, 28 and 29 capable of assuming two positions are provided for manually controlling the operation of motive elements which in the embodiment shown in FIG. 2 are in the form of electric stepping motors 31, 32, 33 and 34 of the type supplied by Superior Electric. As hereinafter explained, each motor can be provided for performing functions along one axis. For example, motor 31 can be utilized for performing functions on an X axis; motor 32 on a Y axis; motor 33 on a Z axis; and motor 34 on a theta axis. As hereinafter explained, the levers or handles of the control switches 26, 27, 28 and 29 are utilized for positioning the motive elements in the form of motors in the desired location or condition for each sequence. The control switches 26, 27, 28 and 29 have a continuous "scan" position and an individual step "jog" position. An external function toggle switch 36 capable of assuming on and off positions is provided for actuating external functions. A record push button 37 is provided for recording in a memory 38 (see Figure in the form of an Intel type 1101 integrated circuit 2) the absolute number of motor steps or increments from a fixed reference point, i.e., zero, to the motive elements in the form of the motors 31, 32, 33 and 34 have moved during the sequence under consideration. A control switch 39 is provided and is capable of assuming four positions in accordance with the number of control switches 26, 27, 28 and 29 so that a display indicator 41 will indicate any motor's position with reference to "0" up to a maximum of 99,999 steps. The sequence display indicator 24 automatically shifts to the next higher number when the record push button 37 is pushed. As hereinafter explained, all subsequent sequences or steps are programmed by repeating steps of the above character. After the last desired motion is completed, the control apparatus is returned manually to its initial motor positions and the final record function is activated by pushing the end of program push button 42.

The mode selector switch 18 is then placed in the operate position or mode which is utilized to produce multiple repetitions of the previously learned sequences or steps in the program which has been memorized by the memory. The sequence select switches 21 and 22 are placed in the beginning sequence number (usually 01) and the display push button 23 is operated so that the same number will appear in the display 24. A switch 19 is then placed in either the single cycle or repeat cycle position depending upon which is desired. In the single cycle, the system will perform the desired number of sequences and will stop when the end of program is detected. In the repeat cycle, the entire series of sequences will recycle continuously.

To start either single cycle or repeat cycle operation, a start push button 43 is pushed. The motor coordinates for the first sequence or step are read from the memory 38 and are fed to the appropriate axes to operate the motors 31, 32, 33 and 34 for subsequent sequences or steps and/or subsequent cycles depending upon the position of the switch 19. A pause push button 44 interrupts the operation of the apparatus at the end of any sequence or step and the stop push button 46 will interrupt operation at any point in any sequence or step.

Referring now to the block diagram shown in FIG. 2, it can be seen that the electronic control apparatus consists of the memory 38 hereinbefore described. By way of example, the memory 38 can be a conventional 256 word by 4 bit random access memory. As shown, the address register 47 is connected to the memory 38 and the selector switches 21 and 22 are connected to the address register. The address register 47 is also a binary connector which permits sequential addressing of the memory for each program execution. The lower order four bits of the memory address register 47 sequentially address the 16 digits of the program while the higher order bits specify the particular program sequence to be executed. The output of the memory 38 is supplied to a data read bus 51. The data read bus 51 is connected to a plurality of registers 52, 53, 54, 55 and 56. Any desired number of registers can be provided and the registers can store any desired amount of information. By way of example, in the control apparatus shown in FIG. 2, the five registers have been designed so that they are capable of storing 16 four bit words or digits. Thus, by way of example, register 52 is provided for storing five digits, register 53 for storing five digits, register 54 for storing three digits, register 55 for storing two digits, and register 56 for storing one digit. The outputs of the registers 52–55 are supplied to comparators 57, 58, 59 and 60 which have 5 digit, 5 digit, 3 digit and 2 digit capabilities, respectively. The comparators 57–60 also receive information from up/down counters 61, 62, 63 and 64 which have 5 digit, 5 digit, 3 digit and 2 digit capabilities, respectively. Counters 61–64 have bi-directional capability. The motors 31, 32, 33 and 34 are slaved in open loop fashion to the counters 61–64 so that the counters move step by step with the motors 31–34.

The outputs of the comparators 57–60 are supplied to motor controls 66, 67, 68 and 69 which drive the motors 31, 32, 33 and 34. The motors controls 66–69 are supplied with power from the motor power supply 71. The motor controls can be of the type supplied by Superior Electric. The motor controls 66–69 are capable of being controlled manually from the switches 26–29 in either a step by step on scan mode.

As hereinbefore explained, the motors 31–34 are preferably in the form of stepping motors as, for example, the "Slo-Syn" manufactured by Superior Electric. Typically, such motors can easily have a resolution of 1.8° per step and capacity 200 steps/revolution (with a motor stepping accuracy of ± 0.05° per step, non-accumulative). The motors are reversible, i.e., they are capable of operating in either direction. The motor controls 66–69 are also conventional. The up/down counters 61–64, the comparators 57–60 and the registers 52–56 are all of a conventional type. For example, the registers 52–56 can be in the form of bistable latches formed from integrated circuits.

The output of the register 56 is connected to an output terminal 72 which is adapted to be connected to other apparatus to perform an external function as hereinafter described.

The information in the counters 61–64 which are slaved to the motors 31–34 is supplied to a data multiplexer 74. The multiplexer 74 is a 16 character input – 1 character output which sequentially scans the 16 data characters supplied by the counters 61–64 and from the external function terminal 72 and supplies this information to a data write bus 76. The information on the data write bus is supplied to the memory 38. The memory 38 is addressed in a sequential mode even though it has random access capabilities. Two octal digits are utilized to identify the address of the information which is being recorded in the memory.

The information supplied by the counters 61–64 is also supplied to another multiplexer 78 which is essentially a 4 by 1 multiplexer where four inputs from the four counters are supplied and in which 1 output is provided under the control of a data display control switch 39 to supply the data with respect to the position of the motor which has been selected in the Nixie display indicator 41. A system sequence logic module 79 is provided which is connected to the motor controls 66–69 to the register 56 and to the multiplexer 74. It is provided for implementing the start/stop and pause functions hereinbefore described in conjunction with the push buttons 43, 44 and 46.

The control apparatus may include optional equipment which is indicated in broken lines within the block 81 which may consist of means for permanently storing the information which is carried by the memory 38 and which has been placed in the memory 38 by the learning process of the apparatus. For example, this information could be permanently stored in a suitable manner such as in a paper tape by means of a teletypewriter 82 of a conventional type which is appropriately coupled by a data format and coupler 83 to the memory 38 and to the system sequence logic 79. In this manner, it is possible to record any program which has been stored in the memory 38 on paper tape and thereafter at a later date to utilize this paper tape and to place the same information in the memory 38. Alternatively, if desired, the information could be supplied directly to the data read bus 51.

Figure 1:
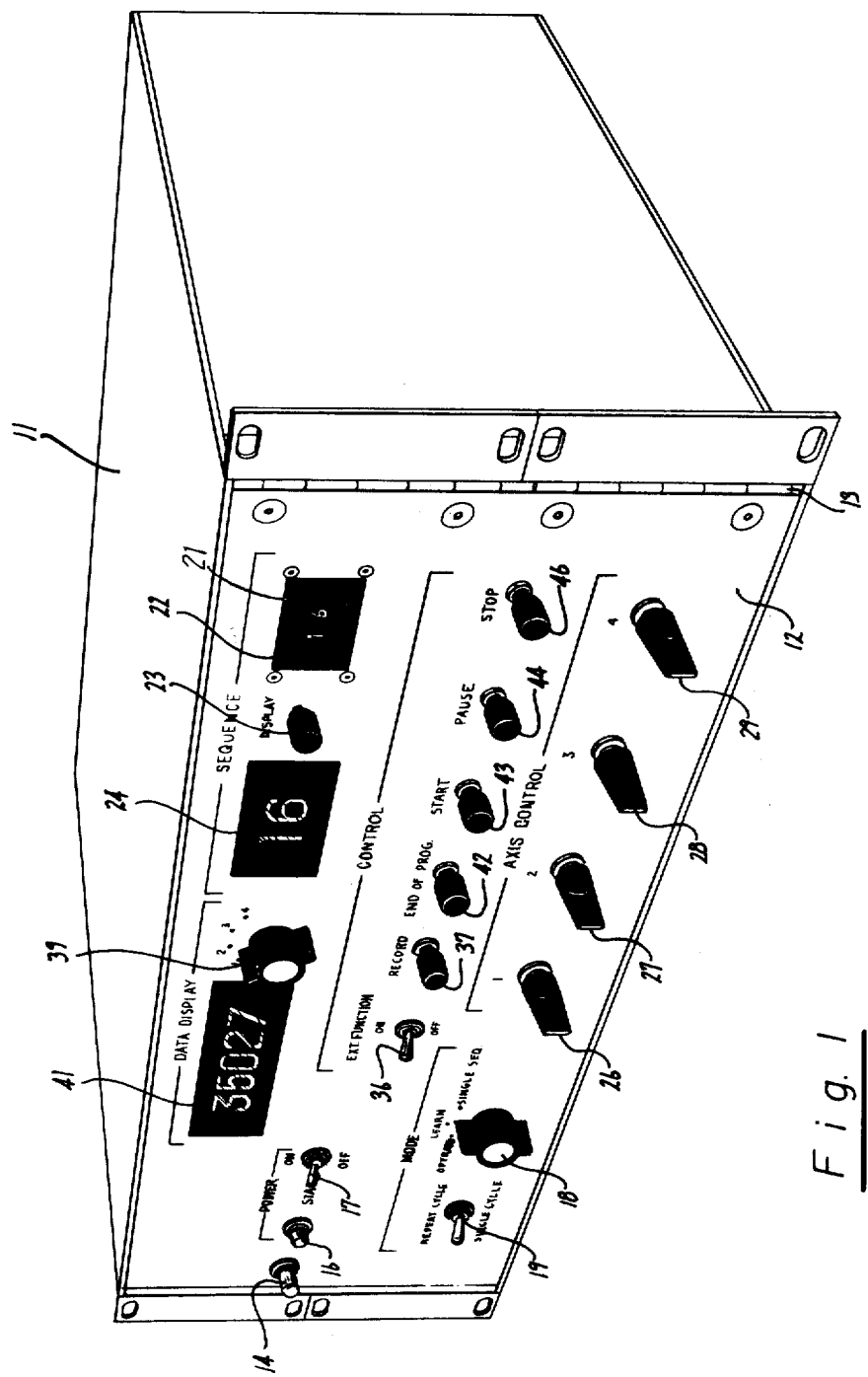
FIG. 1 is a front elevational view of the front panel of electronic control apparatus incorporating the present invention.

Operation and use of the electronic control apparatus shown in FIGS. 1 and 2 in performing the present method may now be briefly described as follows.

THE LEARN MODE

The apparatus is placed in the learn mode by shifting the control switch 18 to the learn position. Let it be assumed that the motors 31, 32, and 33 are being utilized in conjunction with an X, Y, Z, stage of a conventional type and in which the motor 31 is provided for movement along the $X$ axis, motor 32 for movement along the $Y$ axis and motor 33 for movement along the $Z$ axis. Also let it be assumed that the motor 34 is utilized for performing a rotary motion as, for example, rotating a shaft which could be positioned at some initial angle theta which represents 0°. The initial starting point for a member carried by the X,Y,Z stage would be termed the zero location which would be represented by 000 for the positions of the motors 31, 32 and 33 for this position of the member. As indicated in FIG. 2, there is provided a master clear control for all of the counters 61–64 which is provided on the rear of the cabinet 11 which, when actuated, clears all the tracking counters 61–64 to zero. Thus, by definition, as soon as the master clear reset button is pressed, all of the motors 31–34 are referred to absolute zero. Any motion of the motors 31–34, either manually or automatically from that point, is with respect to this absolute zero.

Assuming that it is desired to start the sequence with the number 1, the thumb wheel selector switches 21 and 22 are set at 01 and the display button 23 is pushed so that the numbers 01 also are displayed on the Nixie display 24. The selector switch 39 is then shifted to a position which corresponds to the axis which it is desired to monitor. For example, if it is desired to monitor the movement of the motor 31 along the $X$ axis, the switch 39 is set on position 1 and thereafter the Nixie display 41 will indicate the position of the motor 31 from absolute zero.

Now let it be assumed that it is desired to move the member carried by the X,Y,Z stage to a position which differs from the zero position. The control switches 26, 27 and 28 are then actuated, either one at a time or simultaneously, to the desired positions, first preferably in a scan mode and then by step by step mode until each of the motors is in the exact desired position. This can be accomplished by relatively unskilled operators. It is only necessary for the operator to actually hold the control switches 26, 27 and 28 in the desired positions to cause the desired motions along the $X,Y,Z$ axes to take place so that the member is shifted to the desired position. It is unnecessary for the operator to have any knowledge of how many steps are required in each sequence to arrive at the desired position. It is merely necessary for the operator to visually observe the movement of the member carried by the stage until it is in the desired position. As soon as it is located properly with respect to the $X$, $Y$ and $Z$ axes, the information is ready to be recorded. The fourth motor is actuated by the control switch 29 and it similarly is positioned in the desired location. The information as to the positions of the motors 31–34 relative to absolute zero is tracked by the counters 61–64 and thus carry and retain therein exactly the number of steps which were required for the movement of each motor from absolute zero to bring the member carried by the X,Y,Z stage to the new desired position.

During the operation of the apparatus, it is unnecessary for the operator to observe the counts on the display 41.

The external function switch can then be actuated if desired to perform any additional function such as causing movement of another member or operation of the member. For example, it could be utilized to actuate a solenoid, a suction cup or a relay or other control device.

As soon as the sequence has been completed for the first step, the operator pushes the record push button 37 which causes the information carried by the counters 61–64 and the condition of the external function to be supplied through the data multiplexer 74 into the memory 38 and to be stored therein. The thumb wheel switches 21 and 22 and the display 24 are automatically shifted to the next higher number as, for example, 02 when the record push button 37 is pushed.

Assuming that it is desired to move the member carried by the X,Y,Z stage to subsequent positions within a program, the control switches 26–29 are operated to place the member in the next desired position. Similarly, the external function switch can be operated if desired. As soon as this has been completed, the record push button 37 is again operated to transfer the information retained within the counters 61–64 into the memory 38. The switches 21 and 22 and the sequence counter 24 are again advanced. This same type of operation is repeated until all of the sequences in the program have been programmed into the memory 38. In the embodiment shown in FIG. 2, the memory has a capacity for 16 separate steps or sequences. However, as pointed out previously, if desired, a memory having a larger capacity can be provided. For example, an additional memory can be incorporated into the apparatus merely by utilization of a cable which is connected into the cabinet 11.

As hereinbefore described, the memory 38 has a capacity of 16 separate steps or sequences with each step or sequence being comprised of 16 digits. 15 of the digits are utilized for counter storage, whereas the last or 16th digit is used for control purposes. This last digit contains four bits of data which can be used as follows. For example, one bit can be utilized to flag the last sequence of a set of sequences. The second bit can be utilized to identify whether or not there will be an external function command. The third bit can be utilized for other purposes, and the last or fourth bit can be utilized for flagging the end of a program. This is particularly useful when the program consists of less than 16 steps. Thus, when the last sequence in a program has been reached, the operator instead of pressing the record push button 37, presses the end of program push button 42. Pushing this push button accomplishes exactly the same thing as the record push button and transfers the information from the counters into the memory 38 but, at the same time, also sets the bit which identifies the end of the program. This completes the learn mode.

THE EDIT MODE

Any one of the available 16 sequences or steps can be modified or edited individually without affecting any of the other programmed sequences in the memory 38.

If it is desired to edit or modify one particular sequence of a program, the mode selector switch 18 is placed in the learn position. The sequence selector switches 21 and 22 are shifted to the sequence number to be added and then the display push button 23 is operated. The control levers 26, 27, 28 and 29 are then operated to position the member carried by the stage to the new location desired for this particular sequence or step. The record push button 37 is then pushed which transfers the information carried by the counters 61-64 into the memory 38 and which causes this new program data to replace the program data which previously was in the memory for this particular sequence. All of the other data for the other sequences or steps will remain in the memory 38 as originally programmed.

THE OPERATE MODE

In the operate mode, the electronic control apparatus can be used to produce either multiple repetitions of the previously learned sequences or steps in the program or a single repetition of the same. If multiple repetitions are desired, the mode selector switch 18 is placed in the operate position. The sequence selector switches 21 and 22 are placed at the beginning of the sequence number (usually 01) and the display push button 23 is operated. The repeat cycle/single cycle switch 19 is then placed in the desired position. In the single cycle position, the system will provide the designated number of sequences up to the maximum capacity of the storage 38 and will stop when the end of program "Flag" is detected. In the repeat cycle position of the switch, the entire series of sequences will recycle continuously.

To start the operation, the start push button 43 is depressed. As soon as this occurs, the first set of coordinates for the motors 31-34 and for the external function 72 are read from the memory 38 and are placed in the 16 digit storage registers 52-56. At the same time all four motors 31-34 are turned on and continue to move in progressive steps at the rate of 200 steps per revolution. As pointed out previously, the up/down counters 61-64 keep track of the exact positions of the motors 31-34 and supply their output to the comparators 51-60 which compare these outputs with the information carried by the registers 52-55. The motors 31-34 continue to move until they reach positions which correspond exactly to the information carried by their associated registers 52-55. This is ascertained by the comparators 57-60 which cause the motors 31-34 to be stopped at the desired positions. In other words, the motors are driven to the address specified by the first program step or sequence extracted from the memory 38. As soon as all the motors have reached equality with respect to the storage registers, the apparatus is ready to move to the next sequence. The apparatus will automatically move to the second sequence or program, thence to the third, to the fourth and so on until the end of the program bit is reached. When the end of program bit is reached, the apparatus resets to the initial sequence and starts through the program again. Until operation of the apparatus is stopped, the entire series of sequences will recycle continuously.

In the operate mode, there are a number of sub-modes which are possible. For example, if the mode switch 18 is placed in the single sequence position rather than the operate position, the apparatus moves only one sequence at a time for each operation of the start button. This feature allows the operator to verify a program's accuracy in a step by step manner.

When the switch 19 is placed in the single sequence condition or mode, the apparatus will go through all the sequences or steps in one program, reset to the initial starting point and stop.

The pause and stop buttons 44 and 46 stop the operation of the apparatus. The stop button 46 is an emergency stop and causes an immediate stop at the time it is pressed. The pause button 44 permits the apparatus to continue until an end of sequence is reached.

OTHER FEATURES

It is possible to initiate a sequence in the learn mode from a location other than zero. For example, any arbitrary number such as location 4 can be selected if desired. The apparatus is provided with a switch (not shown) on its back side which is identified, "reset to zero" or "reset to n." If the switch is in the "reset to zero" position, the apparatus will always reset to sequence zero when the last sequence is detected. If the switch is set in the "reset to n" position, the apparatus will reset to the number set on the switches 21 and 22 at the end of the sequence. Thus, for example, these switches are set in the 04 position. The apparatus, after completing these steps, will reset to 4 and continue counting in a sequential manner from the number 4. This feature gives the apparatus additional flexibility in that it is possible to have several programs in the same memory 38 assuming that there is sufficient capacity for the programs. In addition, it is possible to edit out certain steps in a program if one wished to do so merely by operation of this switch.

It should be appreciated that in the present embodiment of the invention there is no provision in the absolute value of the motor position for a negative sign. This means that the initial absolute values set up as reference zero must be unipolar, that is, you must go off the lower left-hand corner or something functionally equivalent to that to establish the reference zero. However, it should be appreciated there is no absolute necessity to do this with the apparatus. However, by utilizing such a reference it is much easier to implement a program.

The apparatus includes one additional feature which permits the information to be retained within the memory 38 even though there is power failure or power to the apparatus is turned off. This is to prevent the necessity of relearning the program. A standby power supply is provided in the apparatus and maintains the field across the MOS memory 38 so that information stored therein will be retained even though there is power failure. Several small rechargeable batteries have been found to be suitable for this purpose and normally will retain the information for a suitable period of time as, for example, over a week-end.

As indicated previously, the number of digits which are utilized in each of the registers, comparators and counters can be tailored to fit the requirements for the apparatus.

It can be seen from the foregoing that there has been provided an electronic control apparatus and method which makes it possible to remember what has been done and then to thereafter repeat continuously what previously had been done. In other words, the electronic control apparatus learns by doing and thereafter is capable of repeating the same steps. No paper tape or other software is required for operation of the basic apparatus. This feature improves the operating convenience of the apparatus and greatly enhances the reliability of the apparatus.

As can be seen, the apparatus can be readily programmed by any semi-skilled operator or production worker in a very short period of time. No computer programmers or other skilled personnel are required. A computer is not required, nor does operation of the control apparatus require any special knowledge, symbolic languages or unusual skills to cause the control apparatus to perform its functions reliably. In addition, the electronic control apparatus has the advantage in that it can be produced relatively inexpensively particularly in comparison to a computer.

Although the electronic control apparatus has been disclosed as being used in conjunction with open loop stepping motors, it is readily apparent to those skilled in the art that if it is desired to speed up the operation of the motors that closed loops can be provided for the stepping motors to ensure that the stepping motors advance to the proper positions. Although stepping motors have been described in conjunction with the apparatus, it is readily apparent that other types of motors and motive elements can be utilized as, for example, d.c. motors. It is only necessary that whatever is driven be capable of being tracked by a counter.

What is claimed is:

1. In an electronic control apparatus, at least one stepping motor having a shaft which is capable of assuming one of a plurality of positions starting from a zero position in accordance with the number of steps supplied to the stepping motor, motor control means for supplying steps for causing operation of said stepping motor, counter means for counting the number of steps supplied to the stepping motor, a memory, means for transferring information from the counter means into said memory and means for using the information in said memory to cause the same number of steps to be supplied to the stepping motor to cause the shaft of the stepping motor to advance from a zero position to said one of a plurality of positions.

2. An apparatus as in claim 1 wherein said means for using the information in the memory includes register means for receiving information from the memory and means for comparing the information in the register means with the information in the counter means.

3. An apparatus as in claim 1 wherein at least three stepping motors are provided.

4. An apparatus as in claim 1 together with start means for starting operation of said apparatus and control switch means for determining whether said apparatus progresses upon each operation of the start means, one step in the sequence, a single sequence, or cyclically through said sequence.

5. An apparatus as in claim 1 together with means connected to said memory for making a permanent record of the information contained in said memory.

6. In an electronic control apparatus, a plurality of stepping motors each having a shaft capable of assuming one of a plurality of positions starting from a zero position in accordance with the number of steps supplied to the motor, motor control means connected to said stepping motors for causing operation of the same, counting means for counting the number of steps supplied to the stepping motors, manual control means operable in the learn mode for causing operation of said motor control means to supply steps to cause said shafts of said stepping motors to assume said one positions and representing a sequence, a memory, means for transferring information from the counting means relative to said one positions and supplying the same to the memory, register means, means for transferring information from the memory into the register means and representing the information which previously had been transferred from the counting means into the memory and comparator means for comparing the information in the register means and the counting means to operate the motor control means to cause the same number of steps to be supplied to the stepping motors so that the shafts of the stepping motors are advanced from said zero positions to said one positions originally assumed in the learn mode.

7. An apparatus as in claim 6 wherein said manual control means can be operated during the learn mode to supply additional steps to cause said shafts of said stepping motors to advance from said one positions to other positions, wherein said means for transferring information can be operated to transfer information into the memory from the counting means on said other positions, and wherein the means for transferring information from the memory into the register means includes means for supplying the information on the other steps.

8. An apparatus as in claim 6 together with means for providing a visual display of information carried by said counting means.

9. An apparatus as in claim 6 wherein said counting means is in the form of a plurality of digital counters, said register means is in the form of a plurality of digital registers and wherein said means for comparing the register means with the counting means is in the form of digital comparators.

10. In an electronic control apparatus, a plurality of stepping motors, each of the stepping motors having a shaft being capable of assuming one of a plurality of positions with respect to a zero position in accordance with the number of steps supplied to the motor, a motor control for supplying steps to each of the stepping motors, manual control means for each of the motor controls operable during the learn mode for advancing the shaft of the stepping motor associated therewith to one position for one sequence, counter means for counting the number of steps supplied to said stepping motors in moving said shafts from said zero positions to said one positions, memory means, means for transferring information carried by the counter means into the memory means to represent a sequence in a program, said means for controlling the motor controls also including means for operating the motor controls to advance the shafts of the stepping motors to other positions to represent another sequence in the program, said means for transferring information carried by the counters into the memory means including means for transferring successive sequences into the memory means to complete the program, register means, means for transferring a sequence at a time from the memory means into the register means and comparator means receiving information from the register means and from the counter means and controlling the motor controls for starting operation of the stepping motors when the information is transferred from the memory means into the register means and for stopping operation of the stepping motors when the information carried by the counter means corresponds to the information carried by the register means and thereafter applying successive sequences to the register means so that the stepping motors pass through the same program as they passed through previously during the learn mode.

11. An apparatus as in claim 10 together with an address register connected to the memory means for addressing the memory to determine the point at which the program is started.

12. An apparatus as in claim 11 together with means for clearing all of said counter means to establish zero positions for said motors.

13. An apparatus as in claim 10 wherein the counter means includes a plurality of counters together with means for displaying the information carried by at least one of the counters.

14. An apparatus as in claim 10 together with means for causing the apparatus to stop at any time during the program.

15. An apparatus as in claim 10 together with additional register means and means adapted to connect said additional register means to an external function.

16. In a method of electronic control for the movement of a plurality of stepping motors in which each has a shaft capable of assuming one of a plurality of positions with respect to a zero position, supplying steps during the learn mode to the stepping motors to cause said shafts of said stepping motors to move from said zero positions to said one positions, counting in the counting means the number of steps supplied to the stepping motors, recording the information in the counting means with respect to said one positions to provide one sequence of a program, supplying additional steps during the learn mode to the stepping motors to cause the shafts to advance to other positions, counting the number of additional steps supplied to the stepping motors, recording the information in the counting means with respect to the additional positions to provide the next sequence in the program, preparing additional sequences in the same manner until the program is completed, and thereafter in the operate mode causing the stepping motors to pass through the sequences which have been recorded by utilizing the recorded information.

* * * * *